United States Patent [19]
Sugiura et al.

[11] Patent Number: 5,674,930
[45] Date of Patent: Oct. 7, 1997

[54] THERMOPLASTIC RESIN COMPOSITIONS

[75] Inventors: Motoyuki Sugiura; Kazumine Ohara, both of Aichi, Japan

[73] Assignee: NOF Corporation, Tokyo, Japan

[21] Appl. No.: 582,739

[22] Filed: Jan. 4, 1996

Related U.S. Application Data

[63] Continuation-in-part of Ser. No. 320,913, Oct. 11, 1994, abandoned, which is a continuation-in-part of Ser. No. 862,829, Apr. 3, 1992, abandoned.

[30] Foreign Application Priority Data

Apr. 4, 1991 [JP] Japan ..................................... 3-071836

[51] Int. Cl.⁶ ..................................................... C08K 3/38
[52] U.S. Cl. ........................ 524/404; 524/423; 524/428; 524/431; 524/441; 524/445; 524/449; 524/451; 524/452; 524/504; 525/64; 525/66; 525/67; 525/68; 525/71; 525/78; 525/79; 525/80; 525/85; 525/86
[58] Field of Search ..................................... 524/504, 423, 524/456, 445, 451, 441, 431, 404, 428, 449, 452; 525/64, 66, 67, 68, 71, 78–80, 85–86

[56] References Cited

U.S. PATENT DOCUMENTS

| | | | |
|---|---|---|---|
| 4,839,423 | 6/1989 | Moriya et al. | 525/79 |
| 4,962,148 | 10/1990 | Orikasa et al. | 525/67 |
| 5,166,240 | 11/1992 | Sakazume et al. | 525/79 |
| 5,326,817 | 7/1994 | Orikasa et al. | 525/68 |
| 5,414,055 | 5/1995 | Sugimura et al. | 525/77 |
| 5,424,359 | 6/1995 | Arashiro et al. | 525/64 |

FOREIGN PATENT DOCUMENTS

| | | | |
|---|---|---|---|
| 159517 | 9/1959 | Germany. | |
| 02 173 049 | of 0000 | Japan. | |
| 58-93730 | 6/1983 | Japan | C08J 7/04 |
| 63-39951 | 2/1988 | Japan | C08L 53/02 |
| 63-122752 | 5/1988 | Japan | C08L 53/00 |
| 2-173049 | 7/1990 | Japan | C08L 23/10 |
| 277 608 | 8/1988 | United Kingdom. | |
| 0412787 | 2/1991 | United Kingdom. | |

Primary Examiner—Mark D. Sweet
Attorney, Agent, or Firm—Limbach & Limbach

[57] ABSTRACT

A thermoplastic resin composition having excellent characteristics such as impact resistance and coatability is described. The thermoplastic resin composition contains a propylene based polymer and a graft copolymer having an olefin homo/co-polymer portion forming its main chain and a vinyl copolymer portion forming its branched portion. In the graft copolymer, the proportion of the olefin homo/co-polymer portion is 5 to 95% by weight, and the vinyl copolymer portion occupies the remaining weight. The vinyl copolymer portion of the graft copolymer has a hydroxyl group as a functional group. One of the olefin homo/co-polymer portion and the vinyl copolymer portion forms a dispersed phase in the other with a particle size of 0.001 to 10 μm. Consequently, the graft copolymer assumes a multiphase structure. The thermoplastic resin composition optionally further contains a thermoplastic elastomer.

15 Claims, 2 Drawing Sheets

Fig. 3
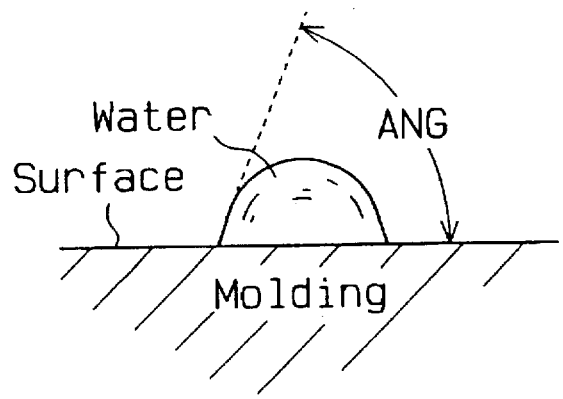
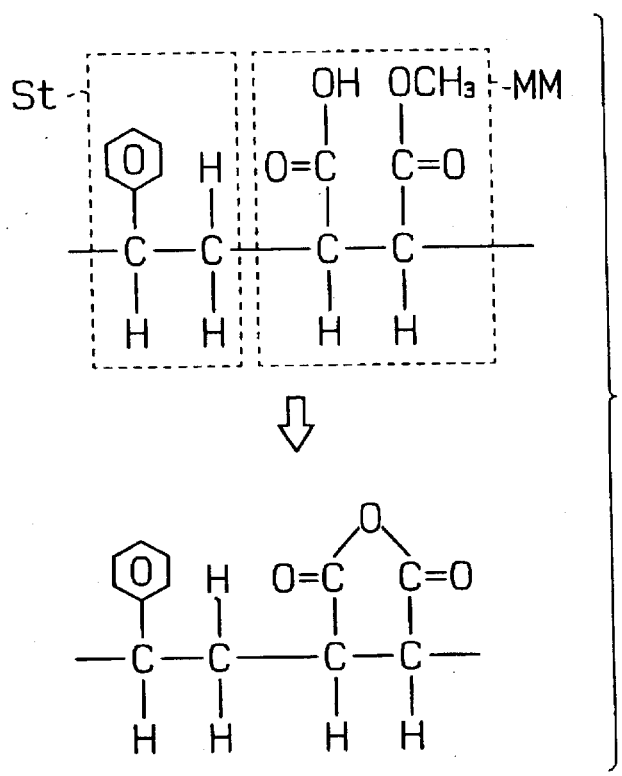
Fig. 4
(Prior Art)

THERMOPLASTIC RESIN COMPOSITIONS

CROSS REFERENCE TO RELATED APPLICATIONS

This is a continuation-in-part of application Ser. No. 08/320,913 filed on Oct. 11, 1994 (the contents of which are incorporated herein by reference) now abandoned, which is a CIP application of the U.S. patent application Ser. No. 07/862,829 filed on Apr. 3, 1992, now abandoned.

BACKGROUND OF THE INVENTION

1. Field of the Invention

The present invention relates to a thermoplastic resin composition having excellent characteristics such as impact resistance and coatability, and particularly to a resin composition to be used as a material for resin molded articles such as a bumper of an automobile.

2. Description of the Related Art

Propylene polymerides or propylene based polymers are widely used for various molded products since they have excellent mechanical properties, processability during molding and chemical resistance and they are inexpensive. However, the propylene polymerides have a drawback in that they have poor impact resistance, coatability (the concept including readiness of being coated, adhesion with a coating film, etc.) and adhesion with an adhesive or a film. For this reason, when the propylene polymeride is used as a bumper, a thermoplastic elastomer is added thereto so as to improve impact resistance and coatability (Japanese Unexamined Patent Publication No. 63-39951 and No. 63-122752). When a bumper is coated, the surface of the bumper is washed with a halogen containing organic solvent such as 1,1,1-trichloroethane and trichloroethylene prior to application of a primer coating and a topcoating.

Meanwhile, in order to overcome the above problems of propylene polymerides, an attempt was made to admix a vinyl type polymer, for example, polystyrene with a propylene polymeride. Japanese Unexamined Patent Publication No. 58-93730 discloses a technique of dispersing polystyrene in a propylene polymeride by blending a polystyrene modified propylene polymeride produced by a specific process with a propylene polymeride.

Japanese Unexamined Patent Publication No. 2-173049 discloses a technique of blending a multi-phase structure graft copolymer having an olefin copolymer portion and a vinyl copolymer portion with a propylene polymeride.

Nowadays, the surface washing process using a halogen containing organic solvent is desirably omitted in order to prevent environmental pollution. The molded products of a composition disclosed in Japanese Unexamined Patent Publication No. 63-39951, however, involves a problem that adhesion of the molded product with a primer is extremely reduced unless the surface of the molded product is washed.

Since the propylene polymeride and polystyrene generally have poor compatibility with each other, only a small amount of polystyrene can be blended with the propylene polymeride. The molded product of such a blend, therefore, still involves a problem that it has low impact resistance. Further, when a technique disclosed in Japanese Unexamined Patent Publication No. 58-93730 is employed, the compatibility of the polystyrene modified propylene polymeride with the propylene polymeride was not always sufficient because the graft efficiency of the polystyrene modified propylene polymeride is low.

The compatibility of the multi-phase structure graft copolymer with the propylene polymeride is improved in the technique disclosed in Japanese Unexamined Patent Publication No. 2-173049. Since polymers constituting the multi-phase structure graft copolymer have poor affinity with a coating, the resulting composition still has insufficient performance with respect to coatability (particularly adhesion with the coating film).

U.S. Pat. No. 4,962,148 (Orikasa et al.) discloses a thermoplastic resin composition consisting essentially of: (i) a polypropylene; (ii) an engineering plastic such as ABS resin; and (iii) a multi-phase structure graft copolymer as a compatible agent. The graft copolymer includes a main chain made of polyolefin or olefin copolymer such as polypropylene (P.P.) and a branched chain made of vinyl polymer or copolymer obtained from at least one vinyl monomer. According to the disclosure of Orikasa et al., the monomers for the branched vinyl polymer includes vinyl aromatic monomers (e.g. styrene), acrylate and methacrylate monomers, acrylonitrile and methacrylonitrile monomers, and vinyl ester monomers such as vinyl acetate, acrylamide and methacrylamide monomers, and monoesters and diesters of maleic anhydride and maleic acid. As shown in FIG. 1, the graft polymer serves only as a compatible agent between the polypropylene (i) and the engineering plastic (ii). Therefore, none of the elements of the resin composition improve the coating adhesion of the surface of a molding made of the resin composition.

According to Orikasa et al., at least one segment of the main and branched chains of the graft polymer may have a carboxylic group. This is because even when a part of the segments of the graft copolymer is modified by a carboxylic group, the carboxylic group modified segments do not deteriorate the compatibility of the graft copolymer with the polypropylene and/or specific engineering plastic. However, it is generally known that the hydrophilicity of carboxylic group is enhanced under the coexistence with an alkaline base. In such case, carboxylic groups combined to the segments of the graft polymer will drastically deteriorate the compatibility of the graft polymer with hydrophobic polymers such as polypropylene. It should be understood that in Orikasa patent, the use of carboxylic group is permitted only under the condition in which the carboxylic group is not hydrophilic. If the carboxylic group in the graft polymer of Orikasa were replaced with other functional group that is more hydrophilic than carboxylic group, for example hydroxyl group, the graft copolymer could not be used as a compatible agent between the polypropylene (i) and the engineering plastic (ii).

In Orikasa patent, chemical resistance was evaluated by immersing each specimen into a variety of solvents (e.g. methanol and gasoline) at a predetermined temperature for a predetermined time. The chemical resistance is the evaluation concerning whether the specimen made of the resin composition is solved by the solvent, but cannot evaluate adhesion of a molding with a coating formed thereon. Additionally, coating adhesive properties were evaluated by coating each specimen with an acrylic coating material, applying a cellophane adhesive tape on the surface of the coating material, tearing away it therefrom, and observing a state of the surface. The coating adhesive test evaluates coating adhesive properties under dry conditions or environments, but does not evaluate adhesion of a molding with a coating formed thereon under the wet condition in which the coating is moistened by a solvent. In other words, the coating adhesive test can evaluate fundamental adhesion with coating only under very mild and gentle conditions. Actually, a coating applied on a bumper of an automobile, which is made of the thermoplastic resin composition according to Orikasa patent, is likely to be delaminated by gasoline.

SUMMARY OF THE INVENTION

Accordingly, it is a primary objective of the present invention to provide a thermoplastic resin composition having excellent impact resistance, coatability and adhesion while maintaining excellent mechanical properties of propylene resins.

To achieve the foregoing and other objects and in accordance with the purpose of the present invention, an improved thermoplastic resin composition is proposed. The thermoplastic resin composition according to the invention contains a propylene polymeride or propylene based polymer (1) and a graft copolymer (2) having an olefin homo/co-polymer portion forming its main chain and a vinyl copolymer portion forming its branched portion. In the graft copolymer (2), the proportion of the olefin homo/co-polymer portion is 5 to 95% by weight, and the vinyl copolymer portion occupies the remaining weight. The vinyl copolymer portion of the graft copolymer (2) has a hydroxyl group as a functional group. One of the olefin homo/co-polymer portion and the vinyl copolymer portion forms a dispersed phase in the other with a particle size of 0.001 to 10 μm. Consequently, the graft copolymer assumes a multi-phase structure.

BRIEF DESCRIPTION OF THE DRAWINGS

FIG. 3 illustrates a contact angle ANG of a drop of water on a surface of a molding, in the test for evaluating hydrophobicity or hydrophilicity of the molding surface; and FIG. 4 illustrates functional group conversion from a monoester of maleic acid (MM) to a maleic anhydride in a conventional graft polymer having a St-MM copolymer portion.

DETAILED DESCRIPTION OF THE INVENTION

According to the present invention, since the graft copolymer (2) includes an olefin homo/co-polymer portion, compatibility between the graft copolymer (2) and the propylene polymeride (1) can be improved. As the result, the graft copolymer (2) can homogeneously be dispersed in a large amount in the propylene polymeride (1).

Figure 1:
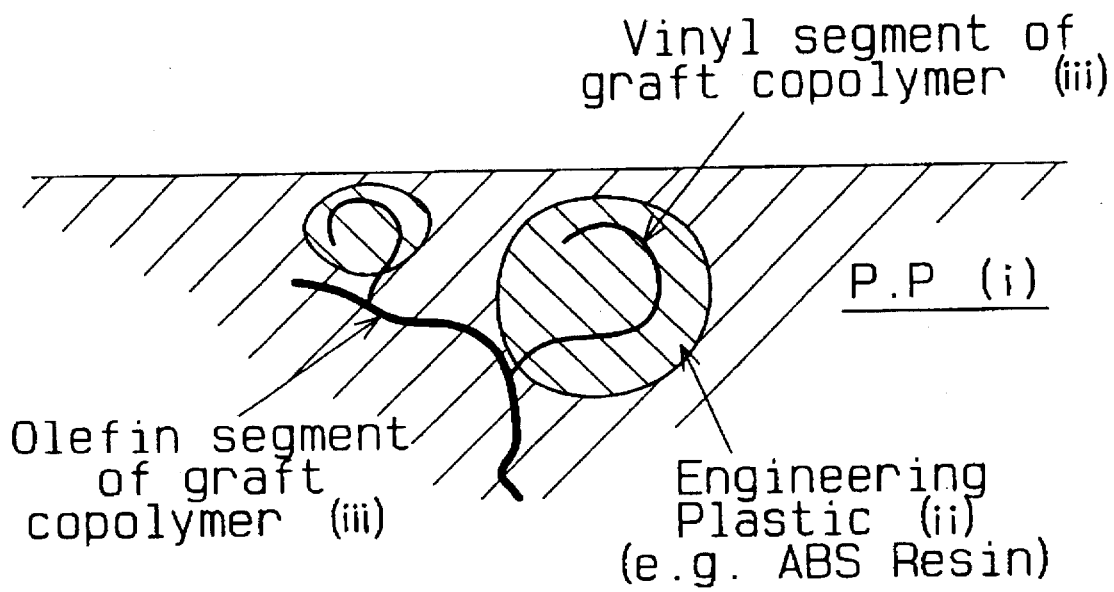
FIG. 1 is a schematic view showing respective polymer components in a molding produced by using the three-components thermoplastic resin composition in accordance with U.S. Pat. No. 4,962,148.
Figure 2:
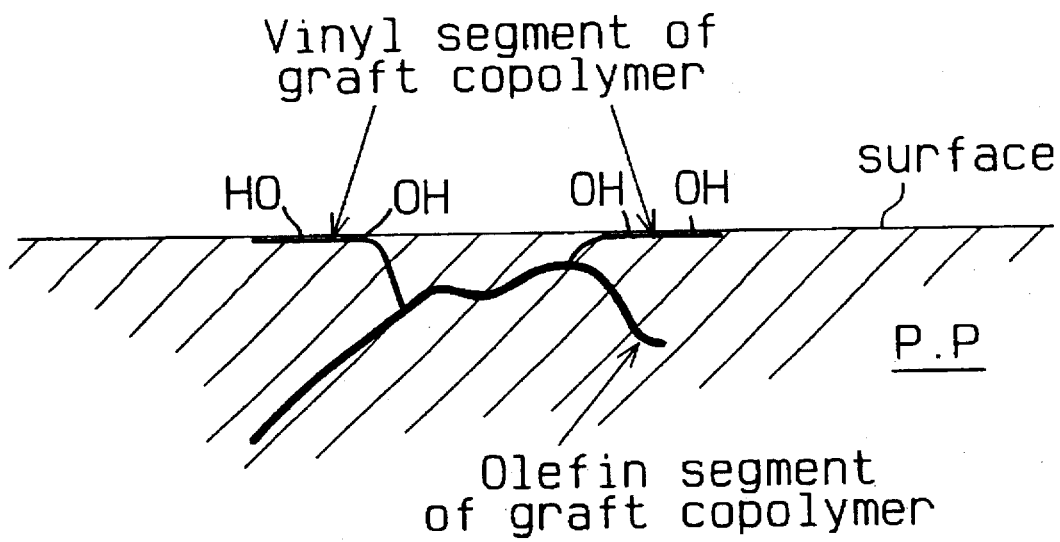
FIG. 2 is a schematic view showing respective polymer components in a molding produced by using the two-components thermoplastic resin composition in accordance with the present invention.

If the proportion of the vinyl copolymer is increased in the thermoplastic resin composition of the invention, the characteristics of the olefin homo/co-polymer and the vinyl copolymer can be exhibited with good balance. In addition, since the vinyl copolymer portion contains a hydroxyl group, the affinity of the resin composition with a coating, and thus, the coatability of the molded products (particularly adhesion with the coating film) can be improved over the conventional molded products. This is because, for example as shown in FIG. 2, the graft branched chain having hydroxyl groups is likely to be located near the surface of a molding, so that the molding surface is modified by the hydroxyl groups. It is very advantageous to introduce or combine a hydroxyl group to a branched chain rather than a main chain of a graft copolymer, in order to promote the location of hydroxyl group near a molding surface.

The constituents of the present invention will be described below in more detail.

Propylene polymeride

The propylene polymeride or propylene based polymer (1) used in the present invention should have crystallizability. Suitable propylene polymerides include, for example, a propylene homopolymer and a copolymer of propylene with other α-olefins or ethylenically unsaturated polar monomers. Propylene polymerides are homo/co-polymers wherein propylene constitutes a substantial portion of the homo/co-polymer. It is preferred that propylene is contained in the homo/co-polymer in an amount of 75% by weight or more.

The propylene polymeride (1) can be exemplified by isotactic polypropylene, a crystalline propylene-ethylene random copolymer, a crystalline propylene-ethylene block copolymer, a crystalline propylene-butene-1 random copolymer and maleic anhydride modified polypropylene. These propylene polymerides can be used in admixture, and other polymers can be added thereto as long as the properties of the propylene polymeride are not impaired.

Multi-phase structure graft copolymer

The graft copolymer (2) having a multi-phase structure used herein has an olefin homo/co-polymer portion (X) and a vinyl copolymer portion (Y). The graft copolymer (2) is thermoplastic. One portion is homogeneously dispersed in the form of spheres in the matrix of the other portion.

The particle size of the dispersed copolymer portion is preferably in the range of 0.001 to 10 μm, more preferably 0.01 to 5 μm. If the particle size is less than 0.001 μm or exceeds 10 μm, dispersibility of the graft copolymer (2) when blended with the propylene polymeride (1) becomes poor. Such poor dispersibility will bring about deterioration in the appearance of the molded products, reduction in impact resistance or lack in the effect of improving coatability.

The number-average molecular weight of the vinyl copolymer portion (Y) in the multi-phase structure graft copolymer (2) is preferably in the range of 5 to 10,000, more preferably 10 to 5,000. If the number-average molecular weight is less than 5, coatability of the molded products prepared by using the present thermoplastic resin composition will not be improved. On the other hand, if it exceeds 10,000, viscosity of the fused composition will be increased, resulting in the deterioration of molding properties and surface luster of the molded products.

In the multi-phase structure graft copolymer (2), the proportion of the olefin homo/co-polymer portion (X) is in the range of 5 to 95% by weight (preferably 20 to 90% by weight), and the vinyl copolymer portion (Y) occupies the remaining weight. In other words, the proportion of the vinyl copolymer portion (Y) is in the range of 95 to 5% by weight (preferably 80 to 10% by weight). If the olefin homo/co-polymer (X) is less than 5% by weight, compatibility of the graft copolymer (2) with the propylene copolymer (1) will be insufficient. On the other hand, if the olefin homo/co-polymer portion (X) exceeds 95% by weight, coatability and adhesion of the molded product obtained by using the present thermoplastic resin composition will not be improved. Olefin homo/co-polymer The olefin homo/co-polymer (X) constituting a part of the multi-phase structure graft copolymer (2) can be exemplified by homopolymers (X1) such as a low density, intermediate density or high density polyethylenes, polypropylenes, polybutene-1, poly-4-methylpentene-1, etc., ethylene copolymers (X2) and α-olefin copolymers (X3) such as propylene copolymers.

Ethylene copolymer

The ethylene copolymer (X2) refers to at least one copolymer selected from the group consisting of an ethylene-α-olefin copolymer (X21), a hydride (X22) of a block or random copolymer consisting essentially of an aromatic vinyl monomer and a conjugated diene monomer, an epoxy group containing ethylene copolymer (X23), a copolymer (X24) of ethylene-unsaturated carboxylic acid or alkyl ester thereof and a metal salt (X25) of such copolymer (X24), and an ethylene-vinyl ester copolymer (X26).

The ethylene-α-olefin copolymer (X21) as the ethylene copolymer (X2) refers to a polymer obtained by copolymerization of ethylene with at least one α-olefin monomer and/or a nonconjugated diene monomer. The α-olefin monomer can be exemplified by unsaturated hydrocarbon compounds having 3 to 20 carbon atoms such as propylene, butene-1, pentene-1, hexene-1, heptene-1, 4-methylbutene-1, 4-methylpentene-1, decene-1, octene-1, etc. Of them, propylene and butene-1 are most preferred as the α-olefin monomer. The unconjugated diene monomer includes ethylidenenorbornene, 1,4-hexadiene, dicyclopentadiene, etc.

The ethylene-α-olefin copolymer (X21) can be exemplified by ethylene-propylene copolymer, ethylene-butene-1 copolymer, ethylene-propylene copolymer rubber, ethylene-propylene-ethylidenenorbornene copolymer rubber, ethylene-propylene-1,4-hexadiene copolymer rubber, ethylene-propylene-dicyclopentadiene copolymer rubber, etc. Of these, an ethylene-propylene copolymer rubber having a Mooney viscosity ($ML_{1+4}$, 100° C.) of 5 to 150 and an ethylene-propylene-diene copolymer rubber having a Mooney viscosity ($ML_{1+4}$, 100° C.) of 15 to 120 and an iodine value of 4 to 30 are most preferred.

In the hydride (X22) of a block or random copolymer consisting essentially of a vinyl aromatic monomer and a conjugated diene monomer, as the ethylene copolymer (X2), the vinyl aromatic monomer can be exemplified by styrene, methylstyrene, dimethylstyrene, ethylstyrene, isopropylstyrene, chlorostyrene, α-methylstyrene, α-ethylstyrene, etc. Of them, styrene is most preferred. The conjugated diene monomer includes 1,3-butadiene, 2-methyl-1,3-butadiene, 2,3-dimethyl-1,3-butadiene, 2-neopentyl-1,3-butadiene, 2-chloro-1,3-butadiene, 2-cyano-1,3-butadiene, linear conjugated pentadienes, linear and branched conjugated hexadienes, etc. Of them, 1,3-butadiene and 2-methyl-1,3-butadiene can preferably be used, and 1,3-butadiene is most preferred.

A first type of the epoxy group containing ethylene copolymer (X23) as the ethylene copolymer (X2) includes a bipolymer of ethylene with a monomer containing both an unsaturated group and a glycidyl group (hereinafter referred to as unsaturated glycidyl group containing monomer) through high pressure radical polymerization, and a terpolymer or multi-polymer of ethylene with an unsaturated glycidyl group containing monomer and another unsaturated monomer. Of such copolymers, those containing 60 to 99.5% by weight of ethylene, 0.5 to 40% by weight of an unsaturated glycidyl group containing monomer and 0 to 39.5% by weight of another unsaturated monomer are preferred.

The unsaturated glycidyl group containing monomer includes glycidyl esters such as glycidyl acrylate, glycidyl methacrylate, monoglycidyl itaconate, monoglycidyl butenetricarboxylate, diglycidyl butenetricarboxylate, triglycidyl butenetricarboxylate, glydicyl esters of α-chloroallyl, maleic acid, crotonic acid, fumaric acid, etc.; glycidyl ethers such as vinylglycidyl ether, allylglycidyl ether, glycidyloxyethylvinyl ether, styrene-p-glycidyl ether, etc., and p-glycidylstyrene. Of these, glycidyl methacrylate and allylglycidyl ether are particularly preferred.

Above mentioned another unsaturated monomer can be exemplified by at least one monomer selected from the group consisting of olefins, vinyl esters, α,β-ethylenically unsaturated carboxylic acids and derivatives thereof, typically olefins such as propylene, butene-1, decene-1, octene-1 and styrene; vinyl esters such as vinyl acetate, vinyl propionate and vinyl benzoate; acrylic acid, methacrylic acid and esters thereof such as methyl acrylate, methyl methacrylate (these two compounds are hereinafter referred to as "methyl (meth)acrylate"), ethyl (meth)acrylate, propyl (meth)acrylate, butyl (meth)acrylate, 2-ethylhexyl (meth)acrylate, cyclohexyl (meth)acrylate, dodecyl (meth)acrylate and octadecyl (meth)acrylate; maleic acid, maleic anhydride, mono-/di-esters of maleic acid, itaconic acid and fumaric acid; vinyl ethers such as vinyl chloride, vinyl methyl ether and vinyl ethyl ether; and acrylic acid amide compounds. Of these, esters of acrylic acid or methacrylic acid and vinyl esters are more preferred. The most preferred are methyl acrylate, ethyl acrylate, butyl acrylate, methyl methacrylate, ethyl methacrylate, butyl methacrylate and vinyl acetate.

The first type epoxy group containing ethylene copolymer (X23) includes ethylene-glycidyl methacrylate copolymer, ethylene-vinyl acetate-glycidyl methacryate copolymer, ethylene-ethyl acrylate-glycidyl methacrylate copolymer, ethylene-carbon monoxide-glycidyl methacrylate copolymer, ethylene-glycidyl acrylate copolymer, ethylene-vinyl acetate-glycidyl acrylate copolymer, ethylene-ethyl acrylate-glycidyl acrylate copolymer, etc. Of these, ethylene-glycidyl methacrylate copolymer, ethylene-vinyl acetate-glycidyl methacrylate copolymer and ethylene-ethyl acrylate-glycidyl methacrylate copolymer are preferred. The most preferred is ethylene-glycidyl methacrylate copolymer. These epoxy group containing ethylene copolymers may be used in combination.

Now, a process for preparing the first type epoxy group containing ethylene copolymer (X23) will be described.

For preparing the copolymer (X23), a high-pressure radical polymerization process is employed. To describe the process more specifically, ethylene (60.0 to 99.5% by weight), at least one kind of unsaturated glycidyl group containing monomer (0.5 to 40.0% by weight) and at least one kind of other ethylenically unsaturated monomer (0 to 39.5% by weight) are blended to prepare 100% by weight of a monomer mixture, and the resulting mixture is sealed in a reactor having a shape of tank or tube. Then, polymerization of the monomer mixture is carried out under the condition of a reaction pressure of 500 to 4000 kg/cm² (preferably 1000 to 3500 kg/cm²) and a reaction temperature of 50° to 400° C. (preferably 100° to 350° C.) in the presence of 0.0001 to 1.0% by weight of a radical polymerization initiator, a chain transfer agent, and, if necessary, other auxiliaries. The monomer mixture may be fed stepwise into the reactor as the reaction proceeds.

The radical polymerization initiator can be exemplified by peroxide, hydroperoxide, azo compounds, amineoxide compounds, oxygen, etc.

The chain transfer agent includes hydrogen, propylene, butene-1, a saturated aliphatic hydrocarbon (preferably a $C_1$–$C_{30}$ hydrocarbon) such as methane, ethane, propane, butane, isobutane, n-hexane, n-heptane and cycloparaffin; a halogen substituted hydrocarbon such as chloroform and carbon tetrachloride; a saturated aliphatic alcohol (preferably $C_1$–$C_{20}$ alcohol) such as methanol, ethanol, propanol and isopropanol; a saturated aliphatic carbonyl compound (preferably $C_1$–$C_{20}$ carbonyl compound) such as carbon dioxide, acetone and methyl ethyl ketone; and an aromatic hydrocarbon such as toluene, diethylbenzene and xylene.

A second type of the epoxy group containing ethylene copolymer (X23) is a modification of the conventional ethylene homopolymer or ethylene copolymer obtained by addition reaction with the unsaturated glycidyl group containing monomer. The ethylene homopolymer can be exemplified by low density, intermediate density and high density polyethylenes.

The ethylene copolymer can be exemplified by copolymers of ethylene with other α-olefin containing ethylene as the major component, such as ethylene-propylene copolymer, ethylene-butene-1 copolymer, ethylene-hexene-1 copolymer, ethylene-4-methylpentene-1 copolymer, ethylene-octene-1 copolymer, etc.; copolymers of propylene with ethylene and/or other α-olefin containing propylene as the major component, such as a propylene-ethylene block copolymer, ethylene-vinyl acetate copolymer, ethylene-acrylic acid copolymer, ethylene-methacrylic acid copolymer, copolymers of ethylene with acrylate or methacrylate, such as methyl-, ethyl-, propyl-, isopropyl- and butyl-(meth)acrylate; ethylene-maleic acid copolymer, ethylene-propylene copolymer rubber, ethylene-propylene-diene-copolymer rubber and ethylene-vinyl acetate-vinyl chloride copolymer.

These ethylene homopolymers and ethylene copolymers may be used in combination, or in admixture with different kinds of synthetic resins or rubbers.

The unsaturated carboxylic acids, alkyl esters and vinyl esters thereof constituting the copolymer (X24) of ethylene-unsaturated carboxylic acid or alkyl ester thereof, metal salt (X25) of such copolymer (X24) and ethylene-vinyl ester copolymer (X26), as the ethylene copolymer (X2), include those given below.

The unsaturated carboxylic acids can be exemplified by acrylic acid, methacrylic acid, maleic acid, fumaric acid, itaconic anhydride, etc. The unsaturated carboxylic acid alkyl ester monomer includes methyl (meth)acrylate, ethyl (meth)acrylate, propyl (meth)acrylate, butyl (meth)acrylate, cyclohexyl (meth)acrylate, lauryl (meth)acrylate, stearyl (meth)acrylate, monomethyl maleate, monoethyl maleate, diethyl maleate, diethyl fumarate, etc.

The vinyl ester monomers can be exemplified by vinyl acetate, vinyl propionate, vinyl laurate, vinyl stearate, vinyl trifluoroacetate, etc. Of these unsaturated carboxylic acids, alkyl esters and vinyl esters thereof, more preferred are acrylic acid, methacrylic acid, maleic anhydride, methyl acrylate, methyl methacrylate, ethyl acrylate and vinyl acetate. These monomers may be used in combination.

The metal salts (X25) of ethylene-unsaturated carboxylic acids copolymer or alkyl ester copolymer thereof are ion crosslinked ethylene copolymers obtained by addition reaction of copolymers (X24) of ethylene-unsaturated carboxylic acid or alkyl ester thereof with an unsaturated carboxylic acid monomer such as acrylic acid, maleic acid and maleic anhydride, followed by reaction of the thus modified polymer with a metal compound having a valence of 1 to 3.

The metal compounds include nitrates, acetates, oxides, hydroxides, methoxides, ethoxides, carbonates and bicarbonates of metals selected from the group consisting of Na, K, Ca, Mg, Zn, Ba, Fe (divalent or trivalent), Co, Ni and Al. Of them, Na, Mg and Zn metal compounds are particularly preferred. They may be used in combination, if necessary.

α-Olefin copolymer

The α-olefin copolymer (X3) constituting the olefin homo/co-polymer portion (X) of the multi-phase structure graft copolymer (2) is the one obtained by copolymerization of an α-olefin monomer such as propylene with at least one other α-olefin monomer or ethylene.

The α-olefin monomer refers to propylene and unsaturated hydrocarbon compounds having 4 to 20 carbon atoms. The α-olefin monomer can be exemplified by propylene, butene-1, pentene-1, hexene-1, heptene-1, 4-methylbutene-1, 4-methylpentene-1, decene-1, octene-1, etc. Of these, propylene and butene-1 are most preferred.

Copolymers obtained by copolymerization of an α-olefin monomer such as propylene with at least one other α-olefin monomer or ethylene and other unsaturated monomers, such as the unsaturated glycidyl group containing monomer and the unsaturated carboxylic acid monomer, can be used as the α-olefin copolymer (X3). Further, the α-olefin copolymer (X3) may be modified through addition reaction with other unsaturated monomers such as the unsaturated glycidyl group containing monomer and the unsaturated carboxylic acid monomer.

Vinyl copolymer

The vinyl copolymer (Y) constituting a part of the multi-phase structure graft copolymer (2) refers to the copolymer of an unsaturated monomer having a functional group with a vinyl monomer. The functional group containing unsaturated monomer is contained in an amount of at least 0.01% by weight (preferably at least 0.05% by weight, more preferably at least 0.1% by weight) in the vinyl copolymer (Y).

The functional group containing unsaturated monomer may be introduced to the vinyl copolymer (Y) through copolymerization with a vinyl monomer, or through addition reaction with the vinyl homo/co-polymer. A mixture of several kinds of vinyl copolymers (Y) may also be used. Otherwise, free vinyl homo/co-polymers containing no functional group can be admixed with the vinyl copolymer (Y).

It may be proposed that the functional group containing unsaturated monomer is an unsaturated monomer having at least one functional group selected from the group consisting of epoxy group, carboxyl group, hydroxyl group and amino group. According to the present invention, however, hydroxyl group is the best among the four functional groups in that it can improve coatability of the resulting composition without lowering impact resistance.

The hydroxyl group containing unsaturated monomer includes alcohols having an unsaturated bond, esters of monovalent or divalent unsaturated carboxylic acids with unsubstituted divalent alcohols, and esters of monovalent or divalent unsaturated carboxylic acids with unsubstituted alcohols having a valence of 3 or more. Typical examples of these compounds preferably include 3-hydroxy-1-propene, 4-hydroxy-1-butene, cis-4-hydroxy-2-butene, trans-4-hydroxy-2-butene, 3-hydroxy-2-methyl-1-pentene, cis-5-hydroxy-2-pentene, trans-5-hydroxy-2-pentene, cis-1,4-dihydroxy-2-butene, trans-1,4-dihydroxy-2-butene, 2-hydroxyethyl (meth)acrylate, 2-hydroxypropyl (meth)acrylate, 3-hydroxypropyl (meth)acrylate, 2-hydroxyethyl crotonate, pentahydroxyethyl(meth)acrylate, 2,3,4,5-tetrahydroxypentyl (meth)acrylate, etc.

The vinyl monomer constituting the functional group containing vinyl copolymer (Y) includes aromatic vinyl monomers such as styrene, nucleus-substituted styrene (e.g. methylstyrene, dimethylstyrene, ethylstyrene, isopropylstyrene and chlorostyrene) and α-substituted styrene (e.g. α-methylstyrene and α-ethylstyrene); ester monomers of (meth)acrylic acid and alkyls having 1 to 8 carbon atoms (e.g. methyl (meth)acrylate and ethyl (meth)acrylate), acrylonitrile, methacrylonitrile and vinyl ester monomers (e.g. vinyl acetate and vinyl propionate). In addition, other vinyl monomers such as vinyl halides (particularly vinyl chloride), vinylidene halides (particularly vinylidene chloride), vinyl naphthalene, vinyl carbazole, N-phenylmaleimide, N-cyclohexylmaleimide, etc. can be used.

Process for preparing the graft copolymer

When the multi-phase structure graft copolymer (2) is prepared, any of the two grafting techniques generally known, i.e. chain transfer method and ionization irradiation, may be employed. However, the most preferred one will be described below, which is advantageous in that it gives high graft efficiency and causes no agglomeration of the respective polymers (1) and (2) when the resin composition containing the polymers (1) and (2) is heated, and that this process is simple.

First, to 5 to 400 parts by weight of at least one vinyl monomer are added 0.1 to 100 parts by weight of a functional group containing unsaturated monomer per 100 parts by weight of the vinyl monomer and 0.1 to 20 parts by weight of a radically polymerizable organic peroxide represented by the following formula 1 or 2 per 100 parts by weight of the vinyl monomer. In the resulting mixture is dissolved 0.01 to 5 parts by weight of a polymerization initiator per 100 parts by weight of the mixture to prepare a solution. The polymerization initiator has a decomposition temperature of 40° to 90° C. for achieving the half-value period of 10 hours.

Next, 100 parts by weight of an olefin homo/co-polymer (X) is preliminarily suspended in water, and the above solution is added to the suspension, followed by heating under a condition where the polymerization initiator does not substantially undergo decomposition. Thus, the olefin homo/co-polymer (X) is impregnated with the vinyl monomer, functional group containing unsaturated monomer, radically polymerizable organic peroxide and polymerization initiator.

Then, the temperature of the aqueous suspension is elevated to effect copolymerization of the vinyl monomer, the functional group containing unsaturated monomer and the radically polymerizable organic peroxide within the olefin homo/co-polymer (X), whereby a graft precursor containing the olefin homo/co-polymer (X) and the functional group containing vinyl copolymer (Y) can be obtained.

The graft precursor is kneaded in a molten state at a temperature of 100° to 300° C. to give a multi-phase structure graft copolymer (2). During the melt kneading, another kind of olefin homo/co-polymer or vinyl copolymer may additionally be admixed to the graft precursor to prepare a multi-phase structure graft copolymer (2). In the suspension polymerization process, the multi-phase structure graft copolymer (2) may otherwise be obtained by carrying out the synthesis of the graft precursor without using the functional group containing unsaturated monomer, and adding it later to the resulting graft precursor, followed by melt kneading. Of the three processes, the first one wherein the graft precursor is simply melt blended is most preferred.

The thus obtained multi-phase structure graft copolymer (2) is melt kneaded with the propylene polymeride (1) to prepare a thermoplastic resin composition of the present invention. It should be noted that the graft precursor should not necessarily be subjected to melt kneading prior to blending with the propylene polymeride (1). In other words, the graft precursor can directly be mixed with the propylene polymeride (1) and the mixture is melt kneaded to carry out formation of the multi-phase structure graft copolymer and blending with the propylene polymeride at the same time.

The radically polymerizable organic peroxide is represented by the following chemical formula 1 or 2:

FORMULA 1

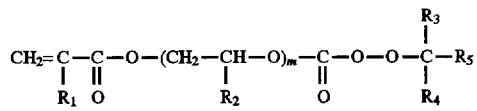

wherein $R_1$ represents a hydrogen atom or an alkyl group having 1 to 2 carbon atoms; $R_2$ represents a hydrogen atom or a methyl group; $R_3$ and $R_4$ each represent an alkyl group having 1 to 4 carbon atoms; $R_5$ represents an alkyl group having 1 to 12 carbon atoms, a phenyl group, an alkyl-substituted phenyl group or a cycloalkyl group having 3 to 12 carbon atoms; and m is 1 or 2.

FORMULA 2

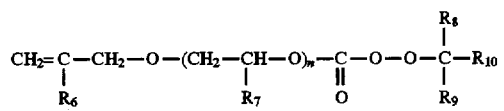

wherein $R_6$ represents a hydrogen atom or an alkyl group having 1 to 4 carbon atoms; $R_7$ represents a hydrogen atom or a methyl group; $R_8$ and $R_9$ each represent an alkyl group having 1 to 4 carbon atoms; $R_{10}$ represents an alkyl group having 1 to 12 carbon atoms, a phenyl group, an alkyl-substituted phenyl group or a cycloalkyl group having 3 to 12 carbon atoms; and n is 0, 1 or 2.

By way of example, suitable radically polymerizable organic peroxide represented by the formula 1 include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylcumylperoxyacryloyoloxyethyl carbonate, t-butylperoxymethacryloyloxyethyl carbonate, t-amylperoxymethacryloyloxyethyl carbonate, t-hexylperoxymethacryloyloxyethyl carbonate, 1,1,3,3-tetramethylbutylperoxymethacyloyloxyethyl carbon ate, cumylperoxymethacryloyloxyethyl carbonate, p-isopropylcumylperoxymethacryloyoloxyethyl carbonate, t-butylperoxymethacryloyloxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethyl carbonate, p-isopropylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethyl carbonate, p-isopropylcumylperoxymethacryloyloxyethyl carbonate, t-butylperoxyacryloyloxyisopropyl carbonate, t-amylperoxyacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylcumylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3- tetramethylbutylperoxymethacryloyloxyisopropyl carbonate, cumylperoxymethacryloyloxyisopropyl carbonate, or p-isopropylcumylperoxymethacryloyloxyisopropyl carbonate, or the like.

The radically polymerizable organic peroxides represented by the formula 2 may take the form of t-butylperoxyallyl carbonate, t-amylperoxyallyl carbonate, t-hexylperoxyallyl carbonate, 1,1,3,3-tetramethylbutylperoxyallyl carbonate, p-penthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-pentaneperoxymethallyl carbonate, cumylperoxymethallyl carbonate, t-butylperoxyallyloxyethyl carbonate, t-amylperoxyallyloxyethyl carbonate, t-hexylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxymethallyloxyisopropyl carbonate, t-amylperoxyallyloxyisopropyl carbonate, t-hexylperoxyallyloxyisopropyl carbonate, t-butylperoxymethallyloxyisopropyl carbonate, t-amylperoxymethallyloxyisopropyl carbonate, or t-hexylperoxymethallyloxyisopropyl carbonate, or the like.

Of these radically polymerizable organic peroxides, t-butylperoxyacryloyloxyethyl carbonate, t-butylperoxymethacryloyloxyethyl carbonate, t-butylperoxyallylcarbonate and t-butylperoxymethallyl carbonate are more preferred. Two or more kinds of the radical polymerizable organic peroxides can be used in combination.

Condition for processing thermoplastic resin compositions

The thermoplastic resin composition according to the present invention can be prepared by melt kneading the propylene polymeride (1) and the multi-phase structure graft copolymer (2).

The weight ratio of the propylene polymeride (1) to the graft copolymer (2) is 1:99 to 99:1 (more preferably 10:90 to 99:1, most preferably 20:80 to 99:1). If the amount of the graft copolymer (2) is less than 1% by weight, coatability of the molded products of the thermoplastic resin composition cannot sufficiently be improved; whereas if it exceeds 99% by weight, heat resistance of the molded product will be reduced.

Melt kneading is preferably carried out at a temperature of 150° to 300 ° C. When the temperature is lower than 150° C., the polymer will be melted incompletely or its melt viscosity will be too high to carry out blending. Consequently, the resulting molded products of such resins will suffer phase separation, lamination peeling, etc. unfavorably. On the other hand, if the temperature exceeds 300° C., decomposition or gelation of the resins to be blended will occur, resulting in the failure of obtaining the desired thermoplastic resin composition.

Melt kneading of the raw material polymers can be carried out using an ordinary kneader such as a Banbury mixer, a kneader mixer, a kneader extruder, a twin screw extruder, a roller system or the like.

A second aspect of the invention of the thermoplastic resin composition is now described.

In the present invention, it is preferred to further blend a thermoplastic elastomer (3) with the resin composition consisting of the propylene polymeride (1) and the multi-phase structure graft copolymer (2). Addition of the thermoplastic elastomer (3) further improves mechanical properties (e.g. impact resistance) of the thermoplastic resin composition according to the first aspect of the present invention.

The thermoplastic elastomer (3) includes diene series rubbers such as polybutadiene, styrene-butadiene copolymer, acrylonitrile-butadiene copolymer and polyisoprene; non-diene series rubbers such as ethylene-α-olefin copolymer and ethylene-α-olefin-polyene copolymer; styrene-butadiene block copolymer; styrene hydride-butadiene block copolymer (i.e., styrene-ethylene-butylene-styrene block copolymer (SEBS)); styrene hydride-isoprene block copolymer; ethylene-propylene elastomer; styrene graft ethylene-propylene elastomer; ethylene type ionomer resins; ethylene-propylene copolymer rubber; and ethylene-propylene-diene copolymer rubber. Two or more kinds of these thermoplastic elastomer (3) can be used in combination.

Thermoplastic elastomers are characterized by their elastic properties i.e., their ability to stretch to twice their original length and to retract rapidly to their original length. Accordingly, thermoplastic elastomers differ from engineering plastics characterized by its hardness, strength, dimensional stability and machinability. Furthermore, thermoplastic elastomer has a very low glass transition temperature (Tg) compared with that of engineering plastic such as ABS resin. Therefore, an elastomer is likely to interact with paints in baking finish process, thus achieving an excellent adhesion with coating. In contrast, an engineering plastic cannot get sufficient interaction with paint due to its high Tg and/or its high melting over the baking temperature, resulting in poor adhesion with coating.

Of the thermoplastic elastomer (3), ethylene-propylene copolymer rubber and ethylene-propylene-diene copolymer rubber are preferred in view of impact resistance, petrol resistance and the surface appearance of the molded products. Copolymer rubbers having a Mooney viscosity of 5 to 150 ($ML_{1+4}$ 100° C.) are more preferred.

Meanwhile, in view of mechanical properties and heat resistance, the thermoplastic elastomer (3) is preferably added in an amount of 1 to 300 parts by weight, more preferably 1 to 200 parts by weight, and most preferably 1 to 100 parts by weight, per 100 parts by weight of the total amount of the propylene polymeride (1) and multi-phase structure graft copolymer (2). If the thermoplastic elastomer (3) is added in an amount of less than 1 part by weight, flexibility of the resulting resin composition will be reduced, unfavorably. On the other hand, if it is added in an amount of more than 300 parts by weight, heat resistance of the resulting resin composition will be lowered.

Other components added to the present thermoplastic resin composition will now be described.

An inorganic filler (4) may be added in an amount of not more than 200 parts by weight per 100 parts by weight of the total amount of the propylene polymeride (1) and multi-phase structure graft copolymer (2). If the inorganic filler (4) is added in an amount of more than 200 parts by weight, impact strength of the resulting molded product will be lowered.

The inorganic filler (4) may assume a variety of shapes including, for example, powder, flake, scale, needle, sphere, hollow body or fiber. Typical examples of inorganic filler (4) include powdery fillers such as barium sulfate, calcium silicate, clay, diatomaceous earth, talc, alumina, borax, glass powders, iron oxide, metal powders, graphite, silicon carbide, silicon nitride, silica, boron nitride, aluminum nitride and carbon black; flaky or scaly fillers such as mica, glass flake, sericite, pyrophylite and aluminum flake or graphite; hollow fillers such as shirasu balloon, metal balloons, glass balloon and pumice; and mineral fibers such as glass fiber, carbon fiber, graphite fiber, whisker, metal fibers, silicone carbide fibers, asbestos and wollastonite.

Of these inorganic fillers (4), barium sulfate, calcium silicate and talc are preferred, and talc is particularly preferred in view of mechanical properties, surface appearance of the resulting molded products and heat resistance. While commercially available talcs can be used, those having an average particle size of 1 to 4 μm are particularly preferred. Two or more of these inorganic fillers (4) can be used in combination.

The surface of the inorganic filler (4) is preferably treated with stearic acid, oleic acid, palmitic acid or metal salts thereof, paraffin wax, polyethylene wax or modified products thereof, organic silanes, organic boranes or organic titanates. Such surface treatment facilitates homogeneous dispersion of the inorganic filler in the resin and improves compatibility with the matrix resin.

Further, an inorganic flame retardant such as magnesium hydroxide and aluminum hydroxide; an organic flame retardant such as halogen or phosphorous containing compounds; additives such as a metal powder, an antioxidant, a UV-discoloration preventive, a lubricant, a dispersant, a coupling agent, a foaming agent, a crosslinking agent, a coloring agent and carbon black; other polyolefin resins; and vinyl resins such as polyvinyl chloride may be added without departing from the spirit of the present invention.

Applications of the present thermoplastic resin composition

The thermoplastic resin composition consisting of the propylene polymeride (1), the multi-phase structure graft copolymer (2) and optionally a thermoplastic elastomer (3) has excellent mechanical properties, molding processability, impact resistance and coatability. Accordingly, such resin composition can be used as a material for various resin molded articles produced by injection molding or extrusion. Resin molded articles can be exemplified by automotive parts such as bumpers, door protectors and mud guards, and electric appliances or building members. The present resin composition is particularly suitably used as a material of automotive bumpers.

DESCRIPTION OF PREFERRED EMBODIMENTS

Preparation of the multi-phase structure graft copolymers (Reference Examples 1 to 4), examples of the present thermoplastic resin compositions prepared using these multi-phase structure graft copolymers and comparative examples of conventional thermoplastic resin compositions will now be described below.

REFERENCE EXAMPLE 1

Preparation of a Multi-phase Structure Graft Copolymer 2A) EPR-g-P(St-r-HPMA)

A 5 liter volume stainless steel autoclave was filled with 2,500 g of a purified water, and then 2.5 g of polyvinyl alcohol as a suspension agent was dissolved therein. To the resulting aqueous solution was added 700 g of an ethylene-propylene copolymer rubber "EPO 7P" (trade name, manufactured by Japan Synthetic Rubber Co., Ltd.), followed by stirring to prepare an aqueous dispersion.

Meanwhile, 1.5 g of benzoyl peroxide "Nyper B" (trade name, manufactured by Nippon Oil & Fats Co., Ltd.) as the polymerization initiator, 6 g of t-butylperoxymethacryloyloxyethyl carbonate as the radically polymerizable organic peroxide and 30 g of hydroxypropyl methacrylate (HPMA) as the functional group containing unsaturated monomer were dissolved in 300 g of styrene (St) as the vinyl monomer. The resulting mixture was placed into the autoclave and stirred.

The autoclave was heated to 60° to 65° C., and the resulting mixture in the autoclave was stirred for 2 hours to impregnate the ethylene-propylene copolymer rubber with the vinyl monomer containing the polymerization initiator, radically polymerizable organic peroxide and a functional group containing unsaturated monomer. Subsequently, the temperature of the autoclave was elevated to 80° to 85° C.

The autoclave was maintained at this temperature for 7 hours to complete polymerization. The product collected from the suspension was then washed with water and dried to give a graft precursor (A). The styrene copolymer, which was extracted from a small amount of the graft precursor (A) with ethyl acetate, proved to have a number-average molecular weight of 900 by gel permeation chromatography (GPC).

The graft precursor (A) was subjected to extrusion treatment using a Laboplastomill single screw extruder (manufactured by Toyo Seiki Seisaku-sho Ltd.) so as to effect grafting reaction and give a graft copolymer (2A). The graft copolymer (2A) includes a main chain made of ethylene-propylene copolymer rubber (EPR) and a branched chain made of random copolymer consisting essentially of styrene (St) and HPMA.

Observation of the graft copolymer (2A) using a scanning electron microscope "JEOL JSM T300" (trade name, manufactured by JEOL, Ltd.) identified that the graft copolymer (2A) has a multi-phase structure in which a truly spherical resin phase having an average particle size of 0.3 to 0.4 μm is homogeneously dispersed therein.

The hydroxyl group containing styrene copolymer showed a graft efficiency of 75%. The term "graft efficiency" used herein means the proportion of the styrene grafted to the ethylene-propylene copolymer rubber of the total amount of the raw material styrene, which can be calculated as follows:

(Graft efficiency)=(Grafted styrene)/(Total styrene)×100

REFERENCE EXAMPLE 2

Preparation of a Multi-phase Structure Graft Copolymer (2E) EtEA-g-P(MMA-r-HPMA)

A multi-phase structure graft copolymer (2E) was prepared in the same manner as in Reference Example 1, except that the ethylene-propylene copolymer rubber used in Reference Example 1 was replaced by ethylene-ethyl acrylate copolymer "Nisseki Rexlon EEA A4200" (trade name, manufactured by Nippon Petrochemicals Co., Ltd.) and that the styrene was replaced by methyl methacrylate (MMA).

The thus obtained graft copolymer (2E) includes a main chain made of ethylene-ethyl acrylate copolymer (EtEA) and a branched chain made of random copolymer consisting essentially of MMA and HPMA. In the graft copolymer (2E), the hydroxyl group containing methyl methacrylate copolymer had a number-average molecular weight of 700. The resin dispersed in this copolymer (2E) had an average particle size of 0.2 to 0.3 μm.

REFERENCE EXAMPLE 3

Preparation of a Multi-phase Structure Graft Copolymer (2F) P(HStBSt)-q-P(St-r-HPMA)

A multi-phase structure graft copolymer (2F) was prepared in the same manner as in Reference Example 1, except that the ethylene-propylene copolymer rubber used in Reference Example 1 was replaced by hydrogenated styrene-butadiene-styrene copolymer rubber "Crayton G1650" (trade name, manufactured by Shell Kagaku Kabushiki-kaisha).

The thus obtained graft copolymer (2F) includes a main chain made of hydrogenated styrene-butadiene-styrene copolymer rubber (P(HStBSt)) and a branched chain made of random copolymer consisting essentially of St and HPMA. In the graft copolymer (2F), the hydroxyl group containing styrene copolymer had a number-average molecular weight of 950. The resin dispersed in this copolymer (2F) had an average particle size of 0.3 to 0.5 µm.

REFERENCE EXAMPLE 4

Preparation of a Multi-phase Structure Graft Copolymer (2G) PC-g-P(St-r-HPMA)

A multi-phase structure graft copolymer (2G) was prepared in the same manner as in Reference Example 1, except that the ethylene-propylene copolymer rubber used in Reference Example 1 was replaced by propylene polymer "Nisseki Polypro J650G" (trade name, manufactured by Nippon Petrochemicals Co., Ltd.).

The thus obtained graft copolymer (2G) includes a main chain made of propylene polymer (PP) and a branched chain made of random copolymer consisting essentially of St and HPMA. In the graft copolymer (2G), the hydroxyl group containing styrene copolymer had a number-average molecular weight of 900. The resin dispersed in this copolymer (2G) had an average particle size of 0.3 to 0.4 µm.

Preparation of a Conventional Multi-phase Structure Graft Copolymer (2H) PP-g-PSt A multi-phase structure graft copolymer (2H) having no functional group was prepared in the same manner as in Reference Example 4, except that the hydroxypropyl methacrylate was omitted.

The thus obtained graft copolymer (2G) includes a main chain made of PP and a branched chain made of polystyrene (PSt). In the graft copolymer (2H), the polystyrene had a number-average molecular weight of 900. The resin dispersed in this copolymer (2H) had an average particle size of 0.3 to 0.4 µm.

Preparation of a Conventional Multi-phase Structure Graft Copolymer (2K) EPR-g-P(St-r-MM)

A multi-phase structure graft copolymer (2K) was prepared in the same manner as in Reference Example 1, except that the hydroxypropyl methacrylate was replaced by monomethylester of maleic acid (MM) (HOOC—CH=CH—COOCH$_3$).

The thus obtained graft copolymer (2K) includes a main chain made of EPR and a branched chain made of random copolymer consisting essentially of St and MM. In the graft copolymer (2K), the maleic acid originated carboxyl group containing styrene copolymer had a number-average molecular weight of 900.

Preparation of a Conventional Multi-phase Structure Graft Copolymer (2L) EGMA-g-PSt A multi-phase structure graft copolymer (2L) was prepared in the same manner as in Reference Example 1, except that ethylene-propylene copolymer rubber (EPR) was replaced by ethylene-glycidyl methacrylate copolymer (EGMA) "Rexpearl RA3150" (manufactured by Nippon Petrochemicals Co., Ltd.) and that hydroxypropyl methacrylate was omitted.

The thus obtained graft copolymer (2L) includes a main chain made of EGMA and a branched chain made of polystyrene homopolymer (PSt). In the graft copolymer (2L), the polystyrene homopolymer had a number-average molecular weight of 850.

EXAMPLES 1 to 7

Examples 1 to 7 shown in Table 1 were prepared by melt kneading the propylene polymeride (1), "Nisseki Polypro J630G" (trade name, manufactured by Nippon Petrochemicals Co., Ltd.) and one multi-phase structure graft copolymer selected from (2A) to (2G) obtained in Reference Examples 1 to 4 at the ratios as shown in Table 1, respectively.

The melt kneading was carried out by extruding the dry blended pellets of raw material resins using a coaxial twin screw extruder having a screw diameter of 30 mm and a cylinder temperature set to 230° C., followed by granulation. The granulated resin was subjected to injection molding to prepare test pieces for various tests. The sizes of the respective test pieces are as follows:

Test piece for Izod impact test:
  13 mm×65 mm×6 mm (notched)
Test piece for deflection temperature under load test:
  13 mm×130 mm×6 mm
Test piece for coating adhesion test:
  45 mm×90 mm×4 mm The following tests were carried out using the test pieces prepared as described above, and the test results are summarized in Table 1.

(1) Izod Impact Test

Izod impact test was carried out according to Japan Industrial Standard (JIS) K7110. More specifically, a hammer impact is given to the notched face of a notched test piece supported perpendicularly to measure the level of absorption energy when the test piece was broken by the impact.

The Izod impact strength is indicated by the value obtained by dividing the absorption energy value by the cross sectional area of the notched portion. The thus obtained Izod impact strength can be a measure of the strength of a resin molded articles having flaws. This test was carried out under two different temperature conditions, i.e. at normal temperature and at −40° C., respectively. Resin molded articles generally become brittle at low temperatures. However, automotive molded articles are sometimes exposed to low temperature environments. Therefore, Izod impact test at −40° C. is carried out in order to examine the strength of the molded articles at low temperatures.

(2) Deflection Temperature under Load Test

This test was carried out according to JIS K 7207. More specifically, a test piece was put under an oil contained in a tank, and a stress of 18.6 kg/cm$^2$ was applied thereto. The temperature of the oil tank was elevated at a rate of 2.0°±0.2° C./min. The deflection temperature under load means the temperature when the test piece underwent a predetermined level of deflection by the heating.

(3) Coating Adhesion Test under Dry Condition

A test piece was coated with a polyolefin primer and then with an acrylic coating. The coating film formed on the test piece was crosscut by eleven each lengthwise and widthwise slits, respectively, at an interval of 1 mm to such a depth that the slits may reach the surface of the base test piece. Thus, 100 squares (1 mm×1 mm) were formed on the test piece. An adhesive cellophane tape (manufactured by Nichiban Co., Ltd.) was applied to the surface of the crosscut coating film and peeled off speedily. The number of squares which remained unpeeled on the test piece was counted. Namely, the greater the number of the squares remaining on the test piece is, the higher is the adhesion of the test piece.

(4) Coating Adhesion Test in Petrol

A test piece coated with the same polyolefin primer and acrylic topcoating as used in the coating adhesion test was immersed in gasoline for 30 minutes to observe surface state of the coating film formed on the test piece. Petrol resistance was evaluated depending on the state of the coating film and indicated by o, Δ or X, the meanings of which are as follows:

o: Intact Δ: Partly peeled X: Entirely peeled

This test evaluates the adhesion of a molding with its coating under the condition in which the coating is immersed in gasoline.

(5) Appearance

A dummy bumper (length: 460 mm×width: 120 mm×height: 56 mm) was formed by injection molding and examined for flow mark on the surface thereof. Flow mark is the trace formed when a molten resin is poured into a mold. Therefore, absence of flow mark means that the molded article has a beautiful appearance, but presence of flow mark means that it has a poor appearance. Flowability of the molten state of resins can be evaluated by observing such flow marks.

EXAMPLES 11 to 15

Examples 11 to 15 shown in Table 2 were prepared by blending a propylene polymeride (1) "Nisseki Polypro J630G" (trade name, manufactured by Nippon Petrochemicals Co., Ltd.), the multi-phase structure graft copolymer (2A) obtained in Reference Example 1 and a thermoplastic elastomer (3) "EPO2P" (trade name, manufactured by Japan Synthetic Rubber Co., Ltd.) at the ratios as shown in Table 2, respectively.

EXAMPLES 21 to 28

Examples 21 to 28 shown in Table 3 were prepared by blending a propylene polymeride (1) "Nisseki Polypro J630G" (trade name, manufactured by Nippon Petrochemicals Co., Ltd.), the graft precursor(A) obtained in Reference Example 1 or one multi-phase structure graft copolymer selected from (2E) to (2G) prepared in Reference Examples 2 to 4, and a thermoplastic elastomer (3) "EPO2P" (trade name, manufactured by Japan Synthetic Rubber Co., Ltd.) at the ratios as shown in Table 3, respectively.

EXAMPLES 31 to 37

Examples 31 to 37 shown in Table 4 were prepared by blending a propylene polymeride (1 ) "Nisseki Polypro J630G" (trade name, manufactured by Nippon Petrochemicals Co., Ltd.), one multi-phase structure graft copolymer selected from (2A) to 2G) obtained in Reference Examples 1 to 4, a thermoplastic elastomer (3) "EPO2P" (trade name, manufactured by Japan Synthetic Rubber Co., Ltd.); and a talc as an inorganic filler (4) at the ratios as shown in Table 4, respectively.

As the talc, "LMS-200" (trade name, manufactured by Fuji Talc Kogyo Co., Ltd.) was used. The amount of the talc shown in Table 4 is indicated in terms of parts by weight per 100 parts by weight of the resin component.

Comparative Examples 1 to 10

Comparative Example 1 shown in Table 5 contains the propylene polymeride (1) "Nisseki Polypro J630G" (trade name, manufactured Nippon Petrochemicals Co., Ltd.) only as the resin content. Comparative Examples 2 to 10 were prepared by blending the same propylene polymeride (1) with one copolymer selected from the group consisting of a multi-phase structure graft copolymer (2H) containing no functional group, a styrene-acrylic acid copolymer (weight ratio: 10/90, number-average molecular weight: 900) and an ethylene-acrylic acid copolymer "Yukalon EEA A-510W" (trade name, manufactured by Mitsubishi Petrochemical Co., Ltd.). Particularly in Comparative Examples 5 to 10, a thermoplastic elastomer (3) "EPO2P" (trade name, manufactured by Japan Synthetic Rubber Co., Ltd.) is additionally employed; and further in Comparative Examples 8 to 10, a talc "LMS-200" (trade name, manufactured by Fuji Talc Kogyo Co., Ltd.) is employed.

As shown in Tables 1 to 4, Examples 1 to 37 all showed excellent coating adhesion, petrol resistance and appearance. They also showed excellent performances in Izod impact strength (notched) and deflection under load.

As shown in Examples 1 to 3, as the proportion of the multi-phase structure graft copolymer to that of polypropylene increases, Izod impact strength is improved. The reason for the excellent Izod impact strength and coating adhesion exhibited in Examples 1 to 3 is considered to be due to the hydroxyl group contained in the vinyl copolymer constituting a part of the multi-phase structure graft copolymer. As the comparison of Example 11 with Examples 12 to 15 shows, Izod impact strength is further improved as the content of thermoplastic elastomer (EPO2P) increases.

On the contrary, in the case of Comparative Example 1 employing polypropylene only, Comparative Examples 2, 5 and 8 employing a multi-phase structure graft copolymer containing no specific functional group and Comparative Examples 3, 4, 6, 7, 9 and 10 employing a mere copolymer but not the graft copolymer, some of the properties such as Izod impact strength, deflection under load, coating adhesion under dry condition, coating adhesion in petrol and appearance are deteriorated.

Comparative Examples 11 to 15

Resin compositions of comparative examples 11, 12 and 13 shown in Table 6 were prepared by melt kneading polypropylene, "Nisseki Polypro J630G" (manufactured by Nippon Petrochemicals Co., Ltd.), ABS resin "Stailac ABS 283" (manufactured by Asahi-Kasei Kogyo Kabushiki Kaisha) and one multi-phase structure graft copolymer selected from (2A), (2K) and (2L) at ratios shown in Table 6. Resin compositions of comparative examples 14 and 15 were prepared by melt kneading polypropylene, "Nisseki Polypro J630G" and one graft copolymer (2K) or (2L).

Referring to Table 6, the compositions of comparative examples 11 and 12, which are made according to Orikasa, have poor coating adhesion under dry condition and poor coating adhesion in petrol, as compared with Example No. 2, which is made in accordance with the present invention. The resulting resin from comparative example 13 has poor coating adhesion under dry condition and poor coating adhesion in petrol, as compared with Example No. 2, having no ABS resin. A comparison of comparative examples 14 and 15 with Example No. 2 indicates that the graft copolymers 2K and 2L according to Orikasa do not contribute to the improvements in coating adhesion.

Evaluation of the characteristic of molding surface

Three test pieces, each having a flat and horizontal surface, were prepared by using the resin compositions of Example No. 2 and Comparative Examples Nos. 14 and 15, respectively. A drop of water was dropped on the surface of each test piece. Then, the contact angle ANG of the water drop as shown in FIG. 3 was measured with a goniometer, type CA-A, manufactured by Kyowa Kaimen Kagaku Kabushiki Kaisha. The results of measurement are as follows:

| Type of used resin composition | Contact Angle (ANG) |
|---|---|
| Example No. 2 (P.P./graft 2A) | 61 degrees |
| Comparative Exam. No. 14 (P.P./graft 2K) | 78 degrees |
| Comparative Exam. No. 15 (P.P./graft 2L) | 92 degrees |

The contact angle ANG is one of indicators showing how hydrophilic or how polarized a test piece surface is. In other words, the smaller contact angle is, the more polarized the test piece surface is. According to the above results, the graft copolymer 2A of the invention causes a molding surface to be more polarized than conventional graft copolymers 2K and 2L. A sufficiently polarized molding surface greatly improves adhesion of the molding surface with a coating applied thereon.

Although the graft copolymer 2K includes carboxyl groups in its branched chains, the contact angle when the graft copolymer 2K is used is larger than the contact angle when the graft copolymer 2A is used. This is because: firstly, carboxyl group is less hydrophilic than hydroxyl group; and secondly, a maleic monoester originated carboxyl group is likely to produce maleic anhydride part due to the condensation between a carboxyl group and a ester group coupled to two adjacent carbons as shown in FIG. 4, resulting in a low density of carboxyl groups on the surface of the test piece. Apparent from the description herein, a hydroxyl group is more preferable than a maleic acid originated carboxyl group, as a hydrophilic functional group to be introduced to a branched chain of a graft copolymer.

TABLE 1-continued

| Example No. | 1 | 2 | 3 | 4 | 5 | 6 | 7 |
|---|---|---|---|---|---|---|---|
| Izod impact strength (kg·cm/cm) (normal temp.) | 18 | 36 | 45 | 33 | 35 | 12 | 13 |
| (−40° C.) | 7 | 16 | 22 | 14 | 16 | 5 | 6 |
| Deflection temp. under load (°C.) | 111 | 110 | 105 | 108 | 106 | 112 | 110 |
| Adhesion with coating (dry) | 100 | 100 | 100 | 100 | 100 | 100 | 100 |
| Adhesion with coating (petrol) | o | o | o | o | o | o | o |
| Appearance (flow mark) | No | No | No | No | No | No | No |

TABLE 2

| Example No. | 11 | 12 | 13 | 14 | 15 |
|---|---|---|---|---|---|
| Polypropylene (wt %) | 80 | 60 | 60 | 50 | 40 |
| Graft copolymer 2A (wt %) | 10 | 5 | 10 | 10 | 30 |
| EPO2P (wt %) | 10 | 35 | 30 | 40 | 30 |
| Izod impact strength (kg·cm/cm) (normal temp.) | 39 | 49 | 50 | 61 | 66 |
| (−40° C.) | 18 | 22 | 26 | 28 | 31 |
| Deflection temp. under load (°C.) | 109 | 104 | 106 | 103 | 96 |
| Adhesion with coating (dry) | 100 | 100 | 100 | 100 | 100 |
| Adhesion with coating (petrol) | o | o | o | o | o |
| Appearance (flow mark) | No | No | No | No | No |

TABLE 3

| Example No. | 21 | 22 | 23 | 24 | 25 | 26 | 27 | 28 |
|---|---|---|---|---|---|---|---|---|
| Polypropylene (wt %) | 80 | 80 | 80 | 80 | 60 | 60 | 60 | 50 |
| Graft copolymer 2E (wt %) | — | 10 | — | — | 10 | — | — | — |
| Graft copolymer 2F (wt %) | — | — | 10 | — | — | 10 | — | — |
| Graft copolymer 2G (wt %) | — | — | — | 10 | — | — | 10 | 20 |
| Graft precursor (A) (wt %) | 10 | — | — | — | — | — | — | — |
| EPO2P (wt %) | 10 | 10 | 10 | 10 | 30 | 30 | 30 | 30 |
| Izod impact strength (normal temp.) | 34 | 32 | 37 | 28 | 46 | 47 | 42 | 50 |
| (kg·cm/cm) (−40° C.) | 15 | 16 | 16 | 14 | 24 | 24 | 23 | 28 |
| Deflection temp. under load (°C.) | 107 | 108 | 107 | 110 | 105 | 103 | 108 | 105 |
| Adhesion with coating (dry) | 100 | 100 | 100 | 100 | 100 | 100 | 100 | 100 |
| Adhesion with coating (petrol) | o | o | o | o | o | o | o | o |
| Appearance (flow mark) | No | No | No | No | No | No | No | No |

TABLE 1

| Example No. | 1 | 2 | 3 | 4 | 5 | 6 | 7 |
|---|---|---|---|---|---|---|---|
| Polypropylene (wt %) | 90 | 80 | 60 | 80 | 80 | 80 | 40 |
| Graft copolymer 2A (wt %) | 10 | 20 | 40 | — | — | — | — |
| Graft copolymer 2E (wt %) | — | — | — | 20 | — | — | — |
| Graft copolymer 2F (wt %) | — | — | — | — | 20 | — | — |
| Graft copolymer 2G (wt %) | — | — | — | — | — | 20 | 60 |

TABLE 4

| Example No. | 31 | 32 | 33 | 34 | 35 | 36 | 37 |
|---|---|---|---|---|---|---|---|
| Polypropylene (wt %) | 80 | 60 | 60 | 60 | 60 | 60 | 40 |
| Graft copolymer 2A (wt %) | 5 | 10 | 10 | — | — | — | — |
| Graft copolymer 2E (wt %) | — | — | — | 10 | — | — | — |
| Graft copolymer 2F (wt %) | — | — | — | — | 10 | — | — |
| Graft copolymer 2G (wt %) | — | — | — | — | — | 10 | 30 |

TABLE 4-continued

| Example No. | 31 | 32 | 33 | 34 | 35 | 36 | 37 |
|---|---|---|---|---|---|---|---|
| EPO2P (wt %) | 15 | 30 | 30 | 30 | 30 | 30 | 60 |
| Talc (Part by weight) | 20 | 20 | 40 | 20 | 20 | 20 | 40 |
| Izod (normal temp.) impact strength | 40 | 59 | 60 | 56 | 58 | 55 | 60 |
| (kg · cm/cm) (−40° C.) | 18 | 26 | 26 | 23 | 23 | 25 | 29 |
| Deflection temp. under load (°C.) | 136 | 133 | 138 | 131 | 128 | 137 | 138 |
| Adhesion with coating (dry) | 100 | 100 | 100 | 100 | 100 | 100 | 100 |
| Adhesion with coating (petrol) | ○ | ○ | ○ | ○ | ○ | ○ | ○ |
| Appearance (flow mark) | No | No | No | No | No | No | No |

TABLE 5

| Comparative Example No. | 1 | 2 | 3 | 4 | 5 | 6 | 7 | 8 | 9 | 10 |
|---|---|---|---|---|---|---|---|---|---|---|
| Polypropylene (wt %) | 100 | 80 | 80 | 80 | 60 | 60 | 60 | 60 | 60 | 60 |
| Graft copolymer 2H (wt %) | — | 20 | — | — | 10 | — | — | 10 | — | — |
| St-acrylic acid copolymer (wt %) | — | — | 20 | — | — | 10 | — | — | 10 | — |
| Ethylene-acrylic acid copolymer (wt %) | — | — | — | 20 | — | — | 10 | — | — | 10 |
| EPO2P (wt %) | — | — | — | — | 30 | 30 | 30 | 30 | 30 | 30 |
| Talc (Part by weight) | — | — | — | — | — | — | — | 20 | 20 | 20 |
| Izod impact strength (normal temp.) | 9 | 30 | 5 | 10 | 30 | 8 | 11 | 49 | 11 | 12 |
| (kg · cm/cm) (−40° C.) | 2 | 15 | 2 | 3 | 10 | 3 | 4 | 21 | 4 | 5 |
| Deflection temp. under load (°C.) | 113 | 107 | 73 | 75 | 100 | 71 | 69 | 122 | 105 | 99 |
| Adhesion with coating (dry) | 40 | 80 | 75 | 70 | 85 | 85 | 80 | 90 | 85 | 85 |
| Adhesion with coating (petrol) | x | Δ | x | x | Δ | x | Δ | ○ | x | Δ |
| Appearance (flow mark) | No | No | Yes | Yes | No | Yes | Yes | No | Yes | Yes |

TABLE 6

| | Comparative Example No. | | | | | Example |
|---|---|---|---|---|---|---|
| | 11 | 12 | 13 | 14 | 15 | No. 2 |
| Polypropylene (wt %) | 60 | 60 | 60 | 80 | 80 | 80 |
| Graft copolymer 2K (wt %) | 10 | — | — | 20 | — | — |
| Graft copolymer 2L (wt %) | — | 10 | — | — | 20 | — |
| Graft copolymer 2A (wt %) | — | — | 10 | — | — | 20 |
| ABS (wt %) | 30 | 30 | 30 | — | — | — |
| Izod (normal temp.) impact strength | 17 | 16 | 20 | 30 | 27 | 36 |
| (kg · cm/cm) (−40° C.) | 4 | 4 | 9 | 11 | 9 | 16 |
| Deflection temp. under load (°C.) | 106 | 107 | 108 | 106 | 108 | 110 |
| Adhesion with coating (dry) | 70 | 70 | 80 | 85 | 80 | 100 |
| Adhesion with coating (petrol) | Δ | Δ | Δ | Δ | Δ | ○ |
| Appearance (flow mark) | No | No | No | No | No | No |

What is claimed is:

1. A thermoplastic resin composition to be used as a material for resin molded articles, comprising:

a propylene based polymer selected from the group consisting of isotactic polypropylene, crystalline propylene-ethylene random copolymer, crystalline propylene-ethylene block copolymer, crystalline propylene-butene-1 random copolymer and maleic anhydride modified polypropylene; and a graft copolymer having an olefin homo/co-polymer portion and a vinyl copolymer portion, said propylene based polymer constituting in the range of 1% to 99% by weight in the thermoplastic resin composition, and said graft copolymer constituting the remainder of the thermoplastic resin composition, wherein said olefin homo/co-polymer portion constitutes in the range of 5% to 95% by weight in said graft copolymer, and the vinyl copolymer portion constitutes the remainder of said graft copolymer; wherein said vinyl copolymer portion is a copolymer of a vinyl monomer with an unsaturated monomer having a hydroxyl group; wherein said unsaturated monomer is contained in an amount of at least 0.1% by in the vinyl copolymer portion; and wherein one of the olefin homo/co-polymer portion and the vinyl copolymer portion form a dispersed phase in the other with a particle size of 0.001 to 10 μm, whereby said graft copolymer assumes a multi-phase structure.

2. The thermoplastic resin composition according to claim 1, wherein said olefin homo/co-polymer portion forms a main chain of the graft copolymer, and said vinyl copolymer portion forms a branched chain of the graft copolymer.

3. The thermoplastic resin composition according to claim 1, wherein the vinyl copolymer portion of the graft copolymer has a number-average molecular weight in the range of 5 to 10,000.

4. The thermoplastic resin composition according to claim 1, wherein said vinyl copolymer portion of the graft copolymer is a copolymer of a vinyl monomer with an unsaturated monomer containing a hydroxyl group.

5. The thermoplastic resin composition according to claim 4, wherein the hydroxyl group containing unsaturated monomer is at least one selected from the group consisting of 3-hydroxy-1-propene, 4-hydroxy-1-butene, cis-4-hydroxy-2-butene, trans-4-hydroxy-2-butene, 3-hydroxy-2-methyl-1-pentene, cis-5-hydroxy-2-pentene, trans-5-hydroxy-2-pentene, cis-1,4-dihydroxy-2-butene, trans-1,4-dihydroxy-2-butene, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxyethyl crotonate, pentahydroxyethyl acrylate, pentahydroxyethyl methacrylate, 2,3,4,5-tetrahydroxypentyl acrylate and 2,3,4,5-tetrahydroxypentyl methacrylate.

6. The thermoplastic resin composition according to claim 4, wherein the vinyl monomer is at least one selected from the group consisting of aromatic vinyl monomers including styrene, methylstyrene, dimethylstyrene, ethylstyrene, isopropylstyrene, chlorostyrene, α-methylstyrene and α-ethylstyrene; $C_1$–$C_8$ alkyl ester monomers with acrylic acid or methacrylic acid including methyl acrylate, methyl methacrylate, ethyl acrylate and ethyl methacrylate; and acrylonitrile, methacrylonitrile, vinyl acetate, vinyl propionate, vinyl halides, vinylidene halides, vinyl naphthalene, vinyl carbazole, N-phenylmaleimide and N-cyclohexylmaleimide.

7. The thermoplastic resin composition according to claim 1, wherein the olefin homo/co-polymer portion of the graft copolymer is at least one selected from the group consisting of homopolymers including polyethylene, polypropylene, polybutene-1 and poly-4-methylpentene-1; ethylene copolymers and α-olefin copolymers.

8. The thermoplastic resin composition according to claim 7, wherein the ethylene copolymer is at least one selected from the group consisting of ethylene-α-olefin copolymer; a hydride of a block or random copolymer consisting of an aromatic vinyl monomer and a conjugated diene monomer; an epoxy group containing ethylene copolymer; a copolymer of ethylene with unsaturated carboxylic acid or alkyl ester thereof and metal salts of such copolymer; and ethylene-vinyl ester copolymer.

9. The thermoplastic resin composition according to claim 7, wherein the ethylene copolymer is ethylene-α-olefin copolymer.

10. The thermoplastic resin composition according to claim 1, wherein the olefin homo/co-polymer portion of the graft copolymer is polypropylene.

11. The thermoplastic resin composition according to claim 1 further comprising a thermoplastic elastomer selected from the group consisting of diene series rubbers including polybutadiene, styrene-butadiene copolymer, acrylonitrile-butadiene copolymer and polyisoprene; non-diene series rubber including ethylene-α-olefin copolymer and ethylene-α-olefin-polyene copolymer; styrene-butadiene block copolymer; styrene hydride-butadiene block copolymer; styrene hydride-isoprene block copolymer; ethylene-propylene elastomer; styrene graft ethylene-propylene elastomer; ethylene type ionomer resins; ethylene-propylene copolymer rubber; and ethylene-propylene-diene copolymer rubber.

12. The thermoplastic resin composition according to claim 11 further comprising an inorganic filler selected from the group consisting of barium sulfate, calcium silicate, clay, diatomaceous earth, talc, alumina, borax, glass powders, iron oxide, metal powders, graphite, silicon carbide, silicon nitride, silica, boron nitride, aluminum nitride, carbon black, mica, glass flake, sericite, pyrophylite, aluminum flake or graphite, shirasu balloon, metal balloons, glass balloon, pumice, glass fiber, carbon fiber, graphite fiber, whisker, metal fibers, silicone carbide fibers, asbestos and wollastonite.

13. A thermoplastic resin composition to be used as a material for resin molded articles comprising:

a propylene based polymer selected from the group consisting of isotactic polypropylene, crystalline propylene-ethylene random copolymer, crystalline propylene-ethylene block copolymer, crystalline propylene-butene-1 random copolymer and maleic anhydride modified polypropylene; and a graft copolymer having an olefin homo/co-polymer portion forming a main chain thereof and a vinyl copolymer portion forming a branched chain thereof, said propylene based polymer constituting in the range of 20% to 99% by weight in the thermoplastic resin composition, and said graft copolymer constituting the remainder of the thermoplastic resin composition, wherein said olefin homo/co-polymer portion constitutes in the range of 20% to 90% by weight in said graft copolymer, and the vinyl copolymer portion constitutes the remainder of said graft copolymer;

wherein said vinyl copolymer portion of the graft copolymer is a copolymer of a vinyl monomer with an unsaturated monomer containing a hydroxyl group, said vinyl copolymer portion has a number-average molecular weight in the range of 5 to 10,000, and said unsaturated monomer is contained in an amount of at least 0.1% by in the vinyl copolymer portion;

wherein one of the olefin homo/co-polymer portion and the vinyl copolymer portion form a dispersed phase in the other with a particle size of 0.001 to 10 μm; and wherein said unsaturated monomer containing hydroxyl group is at least one selected from the group consisting of 3-hydroxy-1-propene, 4-hydroxy-1-butene, cis-4-hydroxy-2-butene, trans-4-hydroxy-2-butene, 3-hydroxy-2-methyl-1-pentene, cis-5-hydroxy-2-pentene, trans-5-hydroxy-2-pentene, cis-1,4-dihydroxy-2-butene, trans-1,4-dihydroxy-2-butene, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxyethyl crotonate, pentahydroxyethyl acrylate, pentahydroxyethyl methacrylate, 2,3,4,5-tetrahydroxypentyl acrylate and 2,3,4,5-tetrahydroxypentyl methacrylate.

14. The thermoplastic resin composition according to claim 13 further comprising a thermoplastic elastomer selected from the group consisting of diene series rubbers including polybutadiene, styrene-butadiene copolymer, acrylonitrile-butadiene copolymer and polyisoprene; non-diene series rubber including ethylene-α-olefin copolymer and ethylene-α-olefin-polyene copolymer; styrene-butadiene block copolymer; styrene hydride-butadiene block copolymer; styrene hydride-isoprene block copolymer; ethylene-propylene elastomer; styrene graft ethylene-propylene elastomer; ethylene type ionomer resins; ethylene-propylene copolymer rubber; and ethylene-propylene-diene copolymer rubber.

15. The thermoplastic resin composition according to claim 14 further comprising an inorganic filler selected from the group consisting of barium sulfate, calcium silicate, clay, diatomaceous earth, talc, alumina, borax, glass powders, iron oxide, metal powders, graphite, silicon carbide, silicon nitride, silica, boron nitride, aluminum nitride, carbon black, mica, glass flake, sericite, pyrophylite, aluminum flake or graphite, shirasu balloon, metal balloons, glass balloon, pumice, glass fiber, carbon fiber, graphite fiber, whisker, metal fibers, silicone carbide fibers, asbestos and wollastonite.

* * * * *